(12) United States Patent
Otaki et al.

(10) Patent No.: US 7,128,182 B2
(45) Date of Patent: Oct. 31, 2006

(54) POWER STEERING SYSTEM

(75) Inventors: Mizuo Otaki, Kanagawa (JP); Masakazu Kurata, Yokohama (JP)

(73) Assignee: Hitachi, Ltd., Tokyo-to (JP)

( * ) Notice: Subject to any disclaimer, the term of this patent is extended or adjusted under 35 U.S.C. 154(b) by 197 days.

(21) Appl. No.: 10/760,347

(22) Filed: Jan. 21, 2004

(65) Prior Publication Data
US 2004/0149510 A1  Aug. 5, 2004

(30) Foreign Application Priority Data
Jan. 23, 2003  (JP) ............................. 2003-014153

(51) Int. Cl.
*B62D 5/065* (2006.01)
(52) U.S. Cl. ...................................... 180/441; 180/442
(58) Field of Classification Search ................ 180/421, 180/422, 439, 441, 442; 91/433, 434
See application file for complete search history.

(56) References Cited

U.S. PATENT DOCUMENTS

| 6,851,507 B1 * | 2/2005 | Kurata et al. ............... 180/422 |
| 2002/0170769 A1 * | 11/2002 | Sakaki et al. ............... 180/441 |
| 2003/0178241 A1 * | 9/2003 | Yokota et al. .............. 180/441 |

FOREIGN PATENT DOCUMENTS

JP  57-201767 A  12/1982

* cited by examiner

*Primary Examiner*—Anne Marie Boehler
(74) *Attorney, Agent, or Firm*—Foley & Lardner LLP (57) ABSTRACT

A power steering system includes first and second drain passages connected to the first and second passages, respectively, and first and second passage switching valves arranged at connections of the first and second drain passages and the first and second passages, respectively. When a hydraulic pump operates to discharge the hydraulic pressure to the first passage, the first passage switching valve provides fluid communication between pump-side and cylinder-side portions of the first passage and closes off the first drain passage. And when the hydraulic pump stops, the first switching valve provides fluid communication between the cylinder-side portion of the first passage and the first drain passage.

14 Claims, 4 Drawing Sheets

POWER STEERING SYSTEM

BACKGROUND OF THE INVENTION

The present invention relates to a power steering system for providing steering force and/or steering assist force by actuating a hydraulic cylinder in accordance with torque input from steering input means or device such as an automotive steering wheel.

Typically, as disclosed in JP-A 57-201767, the power steering system comprises a steering shaft mounted at the center of the steering wheel, a rack-and-pinion arranged at the lower end of the steering shaft, a hydraulic cylinder or hydraulic actuator linked to the rack of the rack-and-pinion, a reversible-type oil pump for relatively supplying hydraulic fluid or pressure to first and second hydraulic chambers defined by a piston of the hydraulic cylinder through first and second passages, and a bypass valve provided to a bypass passage arranged between the first and second passages so as to open and close the bypass passage.

The bypass valve is constructed such that a valve element is opened or closed in accordance with the pilot pressures of pilot passages connected to two discharge ports of the oil pump, putting the bypass passage in communication or closing-off.

When ordinary rightward or leftward steering operation is carried out with the steering wheel during vehicle cruising, a detecting mechanism such as a steering torque sensor detects resultant steering torque to rotate the oil pump in the normal or reverse direction through a control circuit, producing the pilot pressure. Then, the bypass valve is actuated to close off communication of the bypass passage, so that the hydraulic pressure is relatively supplied from the oil pump to the hydraulic chambers, providing steering assist force to steering operation.

On the other hand, when the detecting mechanism detects no steering torque during straight-ahead cruising at medium or high velocity and the like, operation of the oil pump is stopped to allow the bypass valve to provide communication of the bypass passage. Then, hydraulic fluid can flow between the hydraulic chambers, achieving steering operation by steering force of the steering wheel only.

With the typical power steering system, however, the hydraulic circuit forms a normally-closed circuit wherein the bypass valve selectively introduces both the pilot pressure on the discharge side of the oil pump and the pilot pressure on the suction side thereof, opening or closing the bypass passage in accordance with a differential pressure therebetween.

As a result, when the steering wheel is rotated in one direction from the neutral position, the bypass valve is close off to make the hydraulic pressure act on the hydraulic chamber on the one-direction side. Then, when rotation of the steering wheel is stopped, the oil pump generally comes to a stop due to no road load acting the wheels. Although reaction force of spring systems of the wheels and the like acts in the direction of returning the steering wheel to the neutral position, the oil pump has rolling friction produced, providing the hydraulic pressure. Thus, the bypass valve is continuously closed off, leading to degraded operating feel of the steering wheel when returning it to the neutral position.

SUMMARY OF THE INVENTION

It is, therefore, an object of the present invention to provide a power steering system which allows excellent operating feel of the steering wheel when returning it to the neutral position.

The present invention provides generally a power steering system, which comprises: a torque sensor; first and second passages, each including a pump-side portion and a cylinder-side portion; a hydraulic cylinder with first and second chambers, the first and second chambers being connected to the first and second passages, respectively; a hydraulic pump which supplies and discharges a hydraulic pressure to and from the first and second chambers of the hydraulic cylinder in accordance with steering torque of the torque sensor; a drain passage connected to at least one of the first and second passages; and a switching valve arranged at a connection of the drain passage and the at least one passage, wherein when the hydraulic pump operates to discharge the hydraulic pressure to the at least one passage, the switching valve provides fluid communication between the pump-side and cylinder-side portions of the at least one passage and closes off the drain passage, and wherein when the hydraulic pump stops, the switching valve provides fluid communication between the cylinder-side portion of the at least one passage and the drain passage.

BRIEF DESCRIPTION OF THE DRAWINGS

The other objects and features of the present invention will become apparent from the following description with reference to the accompanying drawings, wherein.

DETAILED DESCRIPTION OF THE INVENTION

Referring to the drawings, a power steering system embodying the present invention is described.

Figure 1:
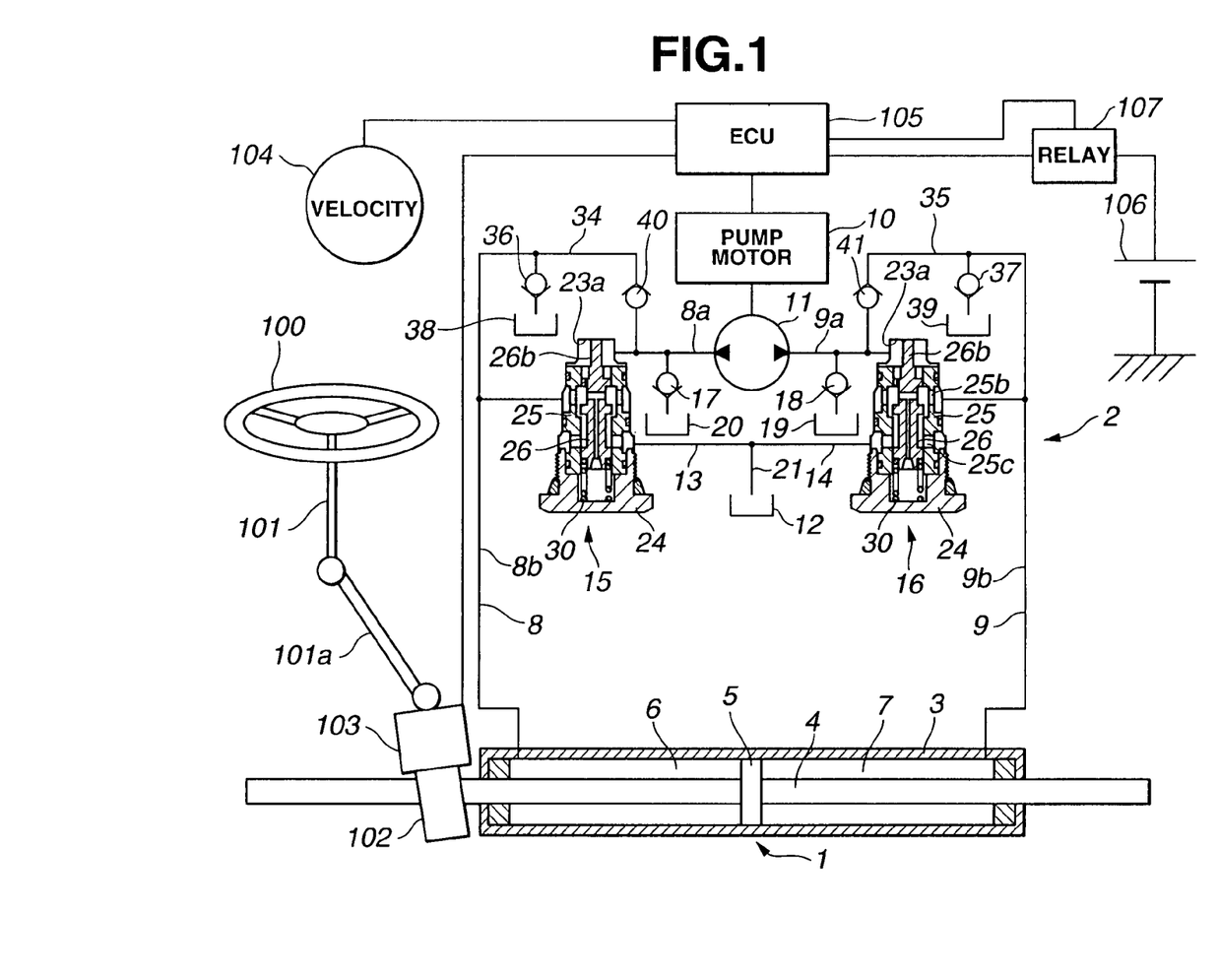
FIG. 1 is a block diagram showing a first embodiment of a power steering system according to the present invention.
Figure 2:
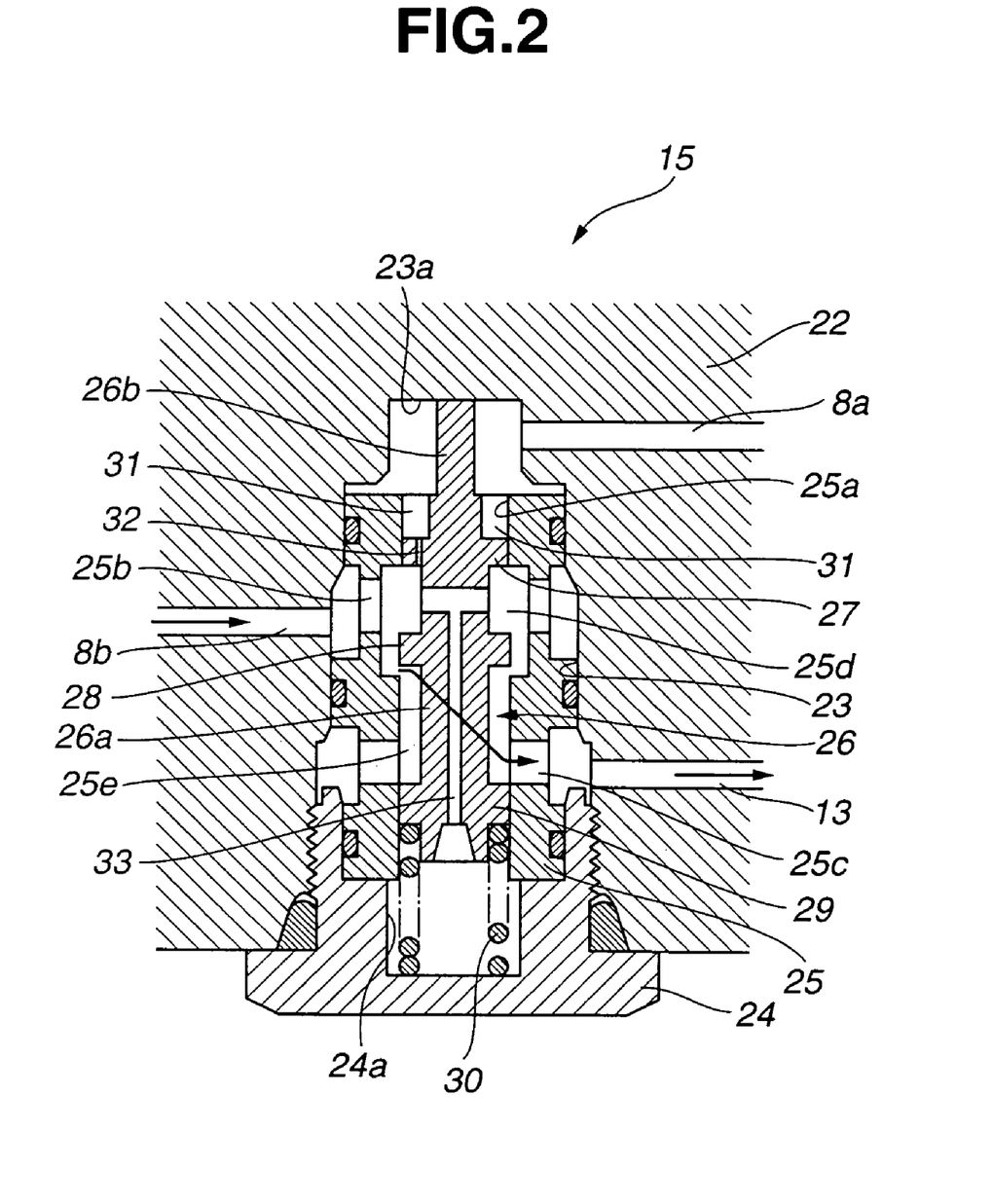
FIG. 2 is a cross sectional view showing a first passage switching valve.
Figure 3:
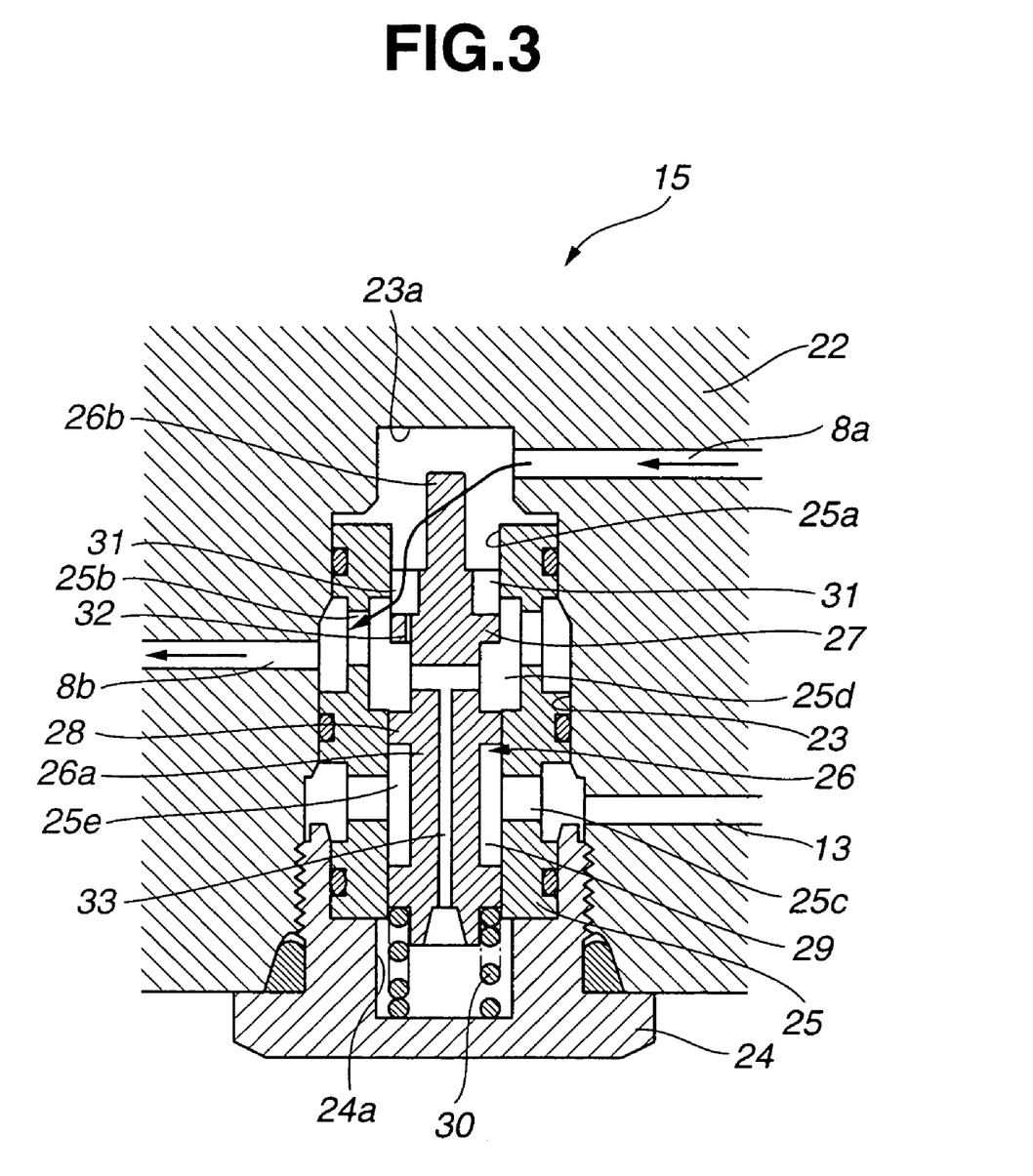
FIG. 3 is a view similar to FIG. 2, showing operation of the first passage switching valve.

Referring to FIGS. 1–3, there is shown first embodiment of the present invention. Referring to FIG. 1, the power steering system comprises a steering wheel or steering input means or device 100, a steering shaft 101 coupled to steering wheel 100 and including an output shaft 101a at the lower end, a rack-and-pinion 102 provided to output shaft 101a, a torque sensor 103 arranged at the lower end of output shaft 101a and for detecting steering torque of steering wheel 100 and road input from right and left front wheels, a vehicle-speed sensor 104 for detecting the velocity of the vehicle, an electronic control unit (ECU) 105 for controlling drive and normal/reverse rotation of a pump motor 10 for a reversible-type pump as will be described later in accordance with detection signals out of torque sensor 103 and vehicle-speed sensor 104, a hydraulic cylinder 1 linked to the rack of rack-and-pinion 102, and a hydraulic circuit 2 for supplying and discharging hydraulic fluid or pressure from hydraulic cylinder 1. The power steering system further comprises a battery 106 for supplying power to ECU 105 and a relay circuit 107.

Hydraulic cylinder 1 comprises a cylinder 3 extending in the cross direction of the vehicle, a piston rod 4 arranged through cylinder 3 and linked to the rack of rack-and-pinion 102, and a piston 5 slidably arranged in cylinder 3 and fixed to piston rod 4. First and second hydraulic chambers 6, 7 are defined in cylinder 3 by piston 5.

Hydraulic circuit 2 comprises a pair of first and second passages 8, 9 each having one end connected to hydraulic chambers 6, 7, a reversible-type pump or hydraulic pump is connected to the other ends of passages 8, 9 and comprising pump motor 10 rotated in the normal or reverse direction by control current out of ECU 105 and an oil pump 11, first and second drain passages 13, 14 branched off from first and second passages 8, 9 and each having a downstream end communicating with a reservoir 12 which is in the atmospheric condition, a pair of passage switching valves 15, 16 arranged at the branch points of discharge or drain passages 13, 14 from first and second passages 8, 9 and actuated in accordance with a differential pressure between pump-side passage portions 8a, 9a and cylinder-side passage portions 8b, 9b of first and second passages 8, 9, and first and second reservoirs 19, 20 for selectively supplying compensating hydraulic fluid to both sides of oil pump 11 through check valves 17, 18 provided to pump-side portions 8a, 9a.

Pump motor 10 serves to control start, stop, and normal/reverse rotation of oil pump 11 by control current out of ECU 105 in accordance with detection signals output by torque sensor 103 and vehicle-speed sensor 104.

Discharge passages 13, 14 have downstream ends connected together, to which a discharge passage 21 communicating with reservoir 12 is connected.

Referring to FIGS. 2 and 3, passage switching valves 15, 16 are substantially the same in structure, thus one of which, i.e. first passage switching valve 15, is illustrated for convenience sake. Referring to FIG. 2, first passage switching valve 15 comprises a housing 22, a valve hole 23 formed in housing 22, a valve body 25 of roughly stepped outer diameter arranged and held in valve hole 23 though a cap 24, and a spool valve element 26 slidably arranged in valve body 25.

Valve hole 23 has an inner diameter reduced gradually stepwise toward a front end 23a. An end of pomp-side passage portion 8a opens to a small-diameter upper portion close to front end 23a of valve hole 23, whereas an end of cylinder-side passage portion 8b opens to a roughly center portion of valve hole 23. Moreover, an end of first discharge passage 13 opens to a lower portion of valve hole 23. Cap 24 is screwed into a maximum-diameter outer end portion of valve hole 23 through a seal ring.

Valve body 25 is formed to provide a hollow inside, and has an upper end portion formed with a first passage hole 25a communicating with front end 23a of valve hole 23 and a roughly center portion formed with a second passage hole 25b communicating with the open end of cylinder-side passage portion 8b. Moreover, valve body 25 has a lower end portion formed with a third passage hole 25c communicating with the end of first discharge passage 13. A plurality of seal rings are arranged at predetermined positions on the outer peripheral surface of valve body 25 to carry out sealing between valve body 25 and valve hole 23.

Spool valve element 26 comprises a shank 26a, a cylindrical first valve portion 27 arranged at an upper end of shank 26a and for providing communication or closing-off between first and second passage holes 25a, 25b, a disc-shaped second valve portion 28 arranged at a roughly center position of shank 26a and for providing communication or closing-off between second and third passage holes 25b, 25c, and a cylindrical slide portion 29 arranged at a lower end of shank 26a.

By biasing force of a coil spring 30 interposed between the bottom of a spring chamber 24a formed in cap 24 and slide portion 29, spool valve element 26 is biased in the direction that first valve portion 27 closes first passage hole 25a, and second valve portion 28 provides communication between second passage hole 25a and third passage hole 25c. Moreover, spool valve element 26 comprises a restricting shaft 26b integrated with first valve portion 27 in the center of the top face thereof and abutting on the ceiling face of front end 23a of valve hole 23 to restrict most upward movement by biasing force of coil spring 30.

A first annular chamber 25d and a second annular chamber 25e are defined in valve body 25 by first and second valve portions 27, 28 and second valve portion 28 and slide portion 29. First annular chamber 25d provides communication between first and second passage holes 25a, 25b as required, whereas second annular chamber 25e provides communication between first annular chamber 25d and third passage hole 25c.

A roughly inverted L-shaped communication passage 33 is formed through shank 26a to provide communication between first annular chamber 25d and spring chamber 24a.

As shown in FIG. 1, bypass passages 34, 35 are arranged between pump-side portions 8a, 9a and cylinder-side portions 8b, 9b of passages 8, 9 to bypass passage switching valves 15, 16.

Reservoirs 38, 39 are connected to bypass passages 34, 35 through negative-pressure check valves 36, 37. Check valves 40, 41 are arranged between negative-pressure check valves 36, 37 and oil pump 11 to allow inflow of hydraulic fluid from check valves 36, 37 to oil pump 11.

Next, operation of the first embodiment is described. When the driver does not rotate steering wheel 100 to maintain it in the neutral position for straight-ahead cruising or the like, ECU 105 outputs no control current to pump motor 10, having oil pump 11 in the non-operating state. Then, referring to FIGS. 1 and 2, since no differential pressure occurs between passages 8, 9, spool valves 26 have restricting shaft 26b raised by biasing force of coil spring 30 up to the most upward position where it abuts on the ceiling face of front end 23a of valve hole 23. Thus, first valve portion 27 closes first passage hole 25a, and second valve portion 28 provides communication between second and third passage holes 25b, 25c through first annular chamber 25d. As a result, cylinder-side passage portions 8b, 9b are in communication through discharge passages 13, 14, and open to reservoir 12, i.e. the atmosphere.

Therefore, in this state, steering wheel 100 can be operated manually.

Then, when rotating steering wheel 100 rightward, for example, oil pump 11 is driven in the normal direction, for example, through pump motor 10 by control current out of ECU 105. By such pump action, hydraulic fluid within second passage 9 is sucked and discharged to pump-side portion 8a of first passage 8.

As shown in FIG. 3, hydraulic fluid within pump-side passage portion 8a depresses first valve portion 27 against biasing force of coil spring 30 from front end 23a of valve hole 23, achieving opening of first passage hole 25a and closing-off of communication between first and second annular chambers 25d, 25e, i.e. between second and third passage holes 25b, 25c by second valve portion 28.

Therefore, the instant when hydraulic fluid within first hydraulic chamber 6 is immediately supplied through first passage 8, hydraulic fluid within first reservoir 19 is also supplied through oil pump 11 and first passage 8, compensating a deficiency. With this, the hydraulic pressure within first hydraulic chamber 6 is increased, obtaining sufficient assist force.

Moreover, when hydraulic fluid flowing into front end 23a of valve hole 23 depress first valve portion 27 as described above, a small amount of hydraulic fluid flows into first annular chamber 25d through orifice 32. And when first valve portion 27 is slightly moved downward, recesses 31 face second annular chamber 25d instantly. Thus, hydraulic fluid flows into second passage hole 25b immediately, resulting in enhanced responsivity of supply to first hydraulic chamber 6.

On the other hand, when steering wheel 100 is returned from the rightward rotated position to the original position, and then rotated leftward, ECU 105 operates to rotate oil pump 11 in the reverse direction through pump motor 10.

As a result, contrary to the foregoing, hydraulic fluid within first hydraulic chamber 6 and second reservoir 20 is discharged to second passage 9, and supplied to second hydraulic chamber 7 through second passage switching valve 16. Then, if drive of pump motor 10 is stopped temporarily to stop thereby rotation of oil pump 11 when steering wheel 100 passes through the neutral position, spool valve element 26 of first passage switching valve 15 is raised by biasing force of coil spring 30 as shown in FIG. 2 as the hydraulic pressure within first passage 8 becomes low.

With this, first valve portion 27 closes first passage hole 25a to close off communication between first and second passage holes 25a, 25b and provide communication between second and third passage holes 25b, 25c through annular chambers 25d, 25e. As a result, low-pressure hydraulic fluid within first hydraulic chamber 6 and cylinder-side passage portion 8b flows through first discharge passage 13, and is discharged to reservoir 12 which is roughly at the atmospheric pressure.

Therefore, hydraulic fluid passing through oil pump 11 is only a slight amount of hydraulic fluid out of second reservoir 20 for compensation, and not hydraulic fluid within first passage 8, allowing prevention of occurrence of great pump friction.

This results in possible achievement of excellent steering feel of steering wheel 100.

As for operation of second passage switching valve 16, in the same way as described with reference to FIG. 3, since spool valve element 26 is moved downward by the discharge pressure of oil pump 11, first valve portion 27 provides communication between first and second passage holes 25a, 25b and closes off communication between second passage hole 25b and second discharge passage 14. Thus, hydraulic fluid is immediately supplied to second hydraulic chamber 7, providing assist force quickly.

Moreover, when switching rotation of steering wheel 100 leftward as described above, and that first passage switching valve 15 closes off communication between first and second passage holes 25a, 25b and provides communication between second and third passage holes 25b, 25c, part of hydraulic fluid confined in front end 23a of valve hole 23 flows into low-pressure first annular chamber 25d through orifice 32. This allows cancellation of the differential pressure before and after orifice 32.

As a result, spool valve element 26 is secured in quick slidability to carry out quick and sure closing-off of communication between passages 25a, 25b through first valve portion 27 by biasing force of coil spring 30 and also quick and sure communication between second and third passage holes 25b, 25c through second valve portion 28.

Second passage switching valve 16 operates in the same way, thus enhancing the responsivity of operation of the power steering system.

When oil pump 11 is rotated in the reverse direction to make hydraulic fluid within first hydraulic chamber 6 flow into second passage 9 through first passage 8, hydraulic fluid is supplied to second passage 9 through reservoir 38, negative-pressure check valve 36 on the side of first passage 8, and bypass passage 34.

As a result, a supply lag of hydraulic fluid to second hydraulic chamber 9 is prevented, allowing further enhancement in the responsivity of assist operation.

Figure 4:
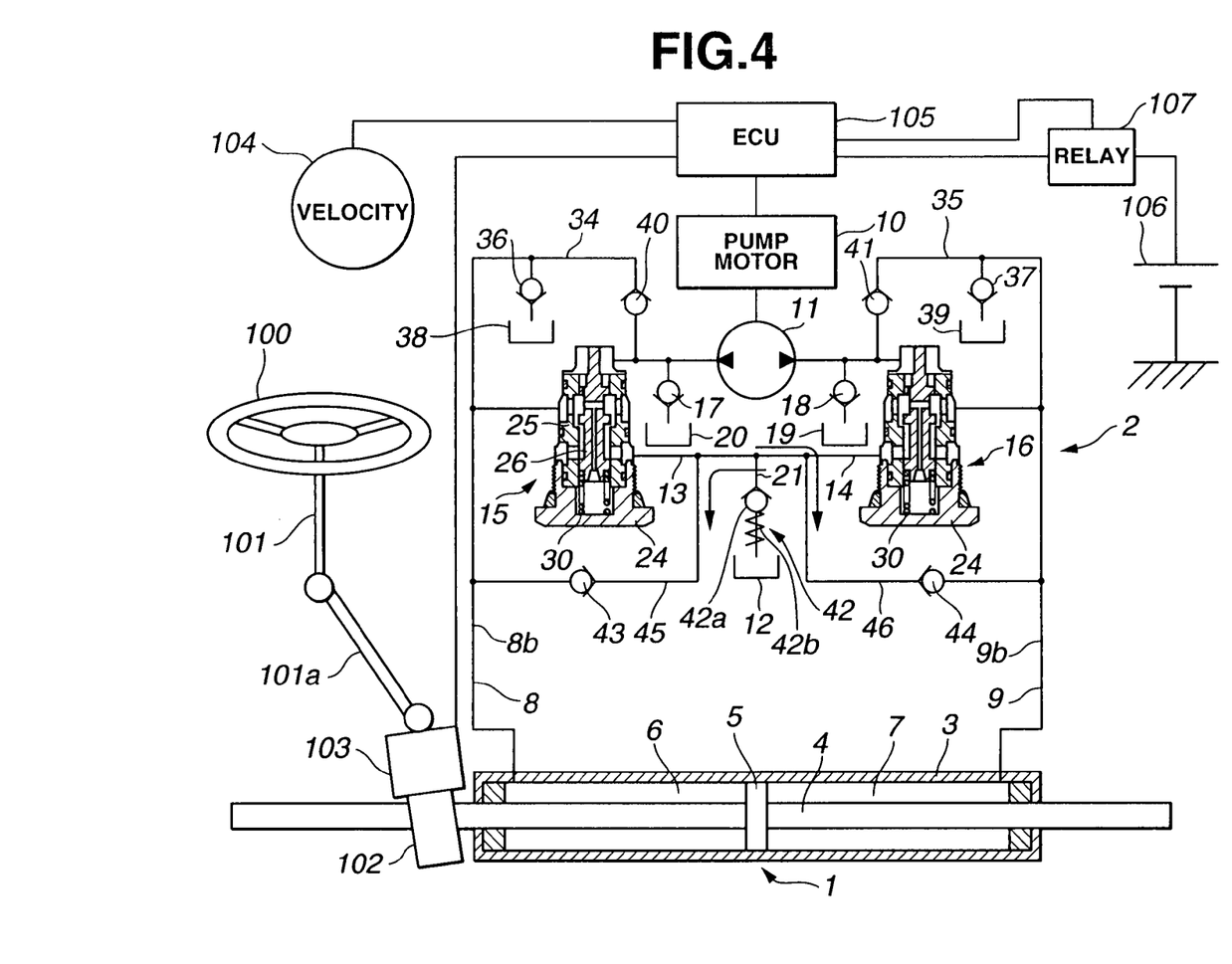
FIG. 4 is a diagram similar to FIG. 1, showing a second embodiment of the present invention.

Referring to FIG. 4, there is shown second embodiment of the present invention which is substantially the same as the first embodiment except that a back-pressure regulating valve 42 is provided to discharge passage 21 located downstream of discharge passages 13, 14, and return passages 45, 46 are arranged between first and second discharge passages 13, 14 to forcedly return hydraulic fluid flowing into discharge passages 13, 14 to second and first hydraulic chambers 7, 6 through check valves 44, 43.

Back-pressure regulating valve 42 serves to maintain the hydraulic pressure within hydraulic circuit 2 at a predetermined value by application of a given pressure of about 0.2 MPa, for example, to hydraulic fluid discharged from discharge passages 13, 14 to reservoir 12 by biasing a ball valve element 42a in the closing direction with a predetermined pressure resulting from biasing force of a spring 42b.

Typically, in hydraulic circuit 2 of the power steering system, hydraulic fluid within hydraulic chambers 6, 7 and first and second passages 8, 9 can suffer entry of air or fractionation anomaly of dissolved gas, i.e. aeration, due to pressure variations and the like.

Then, in the second embodiment, back-pressure regulating valve 42 is provided to discharge passage 21 so as to give compressive force of about 0.2 MPa to whole hydraulic fluid in hydraulic circuit 2, resulting not only in prevention of occurrence of noises and deterioration of steering feel with air trapped in hydraulic fluid and the like, but also in enhancement in the responsivity of operation of the power steering system due to excellent rise of the hydraulic pressure within hydraulic chambers 6, 7 at the time of switching and the like.

Moreover, part of hydraulic fluid flowing into discharge passages 13, 14 is forcedly supplied to hydraulic chambers 7, 6 through return passages 46, 45 without passing through back-pressure regulating valve 42 as shown by arrows in FIG. 4, resulting not only in a reduction in load on back-pressure regulating valve 42, but also in further enhancement in the responsivity of operation of the power steering system due to increased speed of supply to hydraulic chambers 6, 7 by forced supply of hydraulic fluid.

As described above, when rightward or leftward rotation of the steering wheel is stopped, operation of the hydraulic pump is stopped so that the passage switching valve closes off fluid communication between the pump-side and cylinder-side portions of the at least one passage, and provides fluid communication between the cylinder-side portion and the drain passage. Thus, low-pressure hydraulic fluid within the hydraulic cylinder and the cylinder-side portion is discharged through the drain passage to the outside which is roughly at the atmospheric pressure. Therefore, most of hydraulic fluid within at least one passage does not pass through the hydraulic pump, allowing prevention of occurrence of great pump friction. This results in achievement of excellent steering feel of the steering wheel.

Further, since the spool valve element comprises first and second valve portions integrated together, switching of the first and second valve portions can be carried out by application and non-application of the hydraulic pressure out of the hydraulic pump.

Still further, when the hydraulic pump passes from the operation state to the non-operation state, part of hydraulic fluid confined in the pump-side portion of the at least one passage flows into the low-pressure cylinder-side portion of the at least one passage through the orifice, obtaining smooth return of the spool valve element, allowing smooth switching of the passage.

Furthermore, even when the hydraulic pump operates, the front end of the spool valve element on the side of pump-side portion of the at least one passage is held by the valve body, allowing smooth operation of the spool valve element without having slant thereof.

Further, hydraulic fluid within the spring chamber can flow outward thereof, allowing smooth operation of the spool valve element.

Still further, the valve hole opens to the outside of the housing, resulting in easiness of machining of the valve hole and assembling of the passage switching valve.

Still further, the axial position of the spool valve element can appropriately be restricted when the hydraulic pump operates.

Furthermore, the hydraulic fluid supplied from the pump-side portion of the at least one passage is not discharged to the drain passage, allowing efficient achievement of steering assist.

Further, hydraulic fluid is supplied from the hydraulic cylinder to the hydraulic pump without passing through the passage switching valve, achieving smooth circulation of hydraulic fluid, allowing enhancement in the responsivity of steering assist.

Still further, the negative pressure within the hydraulic circuit is prevented from occurring, obtaining smooth steering operation. It is noted that the hydraulic pressure within the hydraulic circuit on the non-application side becomes negative, hitching feel may occur during steering operation.

Still further, the back-pressure regulating valve is provided to the drain passage to give a given compressive force to whole hydraulic fluid in the hydraulic circuit, resulting not only in prevention of occurrence of noises and deterioration of steering feel with air trapped in hydraulic fluid and the like, but also in enhancement in the responsivity of operation of the power steering system due to excellent rise of the hydraulic pressure at the time of switching and the like.

Furthermore, the first and second switching valves are provided to the first and second passages, respectively, resulting in prevention of occurrence of pump friction and enhancement in control accuracy in terms of the whole hydraulic circuit.

Further, part of hydraulic fluid within the hydraulic cylinder on the non-application side is supplied to the hydraulic cylinder on the application side through the return passage without passing through the hydraulic pump, obtaining increased supply speed of hydraulic fluid, resulting in enhancement in the responsivity of operation of the power steering system.

Having described the present invention in connection with the illustrative embodiments, it is noted that the present invention is not limited thereto, and various changes and modifications can be made without departing from the scope of the present invention.

By way of example, stop of operation of the reversible-type pump can occur in the case that at switching of the direction of rotation of steering wheel 100, it is temporarily held in the neutral position, and then switched to another direction after lapse of a predetermined time.

Moreover, steering input means 100 may include electrical steering input means such as a joystick without using steering wheel 100 and steering shaft 101.

The entire contents of Japanese Patent Application P2003-014153 filed Jan. 23, 2003 are incorporated hereby by reference.

What is claimed is:

1. A power steering system, comprising:
    a torque sensor that is configured to sense a steering torque;
    first and second passages, each including a pump-side portion and a cylinder-side portion;
    a hydraulic cylinder with first and second chambers, the first and second chambers being connected to the first and second passages, respectively;
    a hydraulic pump which is configured to supply and discharge a hydraulic pressure to and from the first and second chambers of the hydraulic cylinder in accordance with the steering torque sensed by the torque sensor;
    a drain passage connected to at least one of the first and second passages;
    a switching valve arranged at a connection of the drain passage and the at least one passage,
    wherein when the hydraulic pump operates to discharge the hydraulic pressure to the at least one passage, the switching valve provides a fluid communication between the pump-side and cylinder-side portions of the at least one passage and closes-off the drain passage, and
    wherein when the hydraulic pump stops, the switching valve provides a fluid communication between the cylinder-side portion of the at least one passage and the drain passage,
    wherein the switching valve comprises a valve body formed with a plurality of passage holes communicating with the pump-side and cylinder-side portions of the at least one passage and the drain passage,
    wherein a spool valve element is slidably arranged in the valve body and comprises a first valve portion for opening and closing the passage holes corresponding to the pump-side and cylinder-side portions and a second valve portion for opening and closing the passage hole corresponding to the drain passage, and
    wherein a resilient member is configured to bias the spool valve element in the direction of closing-off a fluid communication between the pump-side and cylinder-side portions by the first valve portion and is configured to provide a fluid communication between the cylinder-side portion and the drain passage by the second valve portion.

2. The power steering system as claimed in claim 1, wherein the first valve portion of the spool valve element is formed with an orifice for providing fluid communication between the pump-side and cylinder-side portions of the at least one passage.

3. The power steering system as claimed in claim 1,
    wherein the first valve portion of the spool valve element is formed with a recessed portion and a non-recessed portion on the side of the pump-side portion of the at least one passage, and wherein when the hydraulic pump operates, the recessed portion provides fluid communication between the pump-side and cylinder-side portions of the at least one passage, and the non-recessed portion is held by the valve body of the switching valve.

4. The power steering system as claimed in claim 1,
wherein the resilient member comprises a coil spring accommodated in a spring chamber formed in the switching valve at an end opposite to the pump-side portion of the at least one passage, and
wherein the spool valve element of the switching valve is formed with a communication passage for providing fluid communication between the cylinder-side portion of the at least one passage and the spring chamber.

5. The power steering system as claimed in claim 1, further comprising:
a housing which accommodates the switching valve,
wherein the housing is formed with a bottomed valve hole, and
wherein the valve hole has an opening concealed with a cap.

6. The power steering system as claimed in claim 5,
wherein the spool valve element comprises a restricting shaft arranged at an end on the side of the pump-side portion of the at least one passage,
wherein when the hydraulic pump stops to operate, the restricting shaft abuts on a bottom of the valve hole to restrict axial position of the spool valve element.

7. The power steering system as claimed in claim 1, wherein the switching valve is constructed such that when the hydraulic pump operates, the second valve portion closes-off the fluid communication between the cylinder-side portion of the at least one passage and the drain passage, and then the first valve portion provides communication between the pump-side and cylinder-side portions of the at least one passage.

8. The power steering system as claimed in claim 1, further comprising:
a bypass passage arranged between the pump-side and cylinder-side portions of the at least one passage, the bypass passage bypassing the switching valve; and
a check valve provided to the bypass passage,
wherein the check valve allows hydraulic fluid to flow from the cylinder-side portion to the pump-side portion only.

9. The power steering system as claimed in claim 8, further comprising:
a negative-pressure check valve provided to the bypass passage at a position closer to the cylinder-side portion than the check valve,
wherein when the negative pressure occurs in the bypass passage, the negative-pressure check valve opens to supply hydraulic fluid to the pump-side portion.

10. The power steering system as claimed in claim 1, further comprising:
a back-pressure regulating valve arranged downstream of the drain passage,
wherein the back-pressure regulating valve maintains the hydraulic pressure within a hydraulic circuit at a predetermined value.

11. The power steering system as claimed in claim 1, wherein the switching valve is provided to each of the first and second passages.

12. The power steering system as claimed in claim 11, further comprising:

a first return passage which connects the drain passage connected to the switching valve of the first passage and the cylinder-side portion of the second passage;
a second return passage which connects the drain passage connected to the switching valve of the second passage and the cylinder-side portion of the first passage;
first and, second check valves provided to the first and second return passages, respectively,
wherein each check valve allows hydraulic fluid to flow from the drain passage to the cylinder-side portion of the corresponding passage.

13. A power steering system, comprising:
a torque sensor that senses a steering torque;
first and second passages, each including a pump-side portion and a cylinder-side portion;
a hydraulic cylinder with first and second chambers, the first and second chambers being connected to the first and second passages, respectively;
a hydraulic pump which is configured to supply and discharge a hydraulic pressure to and from the first and second chambers of the hydraulic cylinder in accordance with the steering torque sensed by the torque sensor;
first and second drain passages connected to the first and second passages, respectively;
first and second switching valves arranged at connections of the first and second drain passages and the first and second passages, respectively, wherein:
when the hydraulic pump operates to discharge the hydraulic pressure to one of the first and second passages, the corresponding switching valve provides fluid communication between the pump-side and cylinder-side portions of the one passage and closes-off the corresponding drain passage, and
when the hydraulic pump stops, the corresponding switching valve provides fluid communication between the cylinder-side portion of the one passage and the corresponding drain passage;
a back-pressure regulatings valve arranged downstream of the first and second drain passages, the back-pressure regulating valve maintaining the hydraulic pressure within a hydraulic circuit at a predetermined value;
a first return passage which connects the first drain passage connected to the first switching valve and the cylinder-side portion of the second passage;
a second return passage which connects the second drain passage connected to the second switching valve and the cylinder-side portion of the first passage;
first and second check valves provided to the first and second re respectively, each check valve allowing hydraulic fluid to flow from the corresponding drain passage to the cylinder-side portion of the corresponding passage,
wherein the first switching valve comprises a first valve body formed with a first plurality of passage holes communicating with the pump-side and cylinder-side portions of the first drain passage and the first passage,
wherein the second switching valve comprises a second valve body formed with a second plurality of passage holes communicating with the pump-side and cylinder-side portions of the second drain passage and the second passage.
wherein a first spool valve element is slidably arranged in the first valve body and comprises a first valve portion for opening and closing the passage holes corresponding to the associated pump-side and cylinder-side portions and a second valve portion for opening and closing the associated passage hole corresponding to the first drain passage, wherein a second spool valve element is slidably arranged in the second valve body and comprises a first valve portion for opening and closing the passage holes corresponding to the associated pump-side and cylinder-side portions and a second valve portion for opening and closing the associated passage hole corresponding to the second drain passage.

wherein a first resilient member is configured to bias the first spool valve element in the direction of closing-off a fluid communication between the associated pump-side and cylinder-side portions by the first valve portion and is configured to provide fluid communication between the associated cylinder-side portion and the first drain passage by the second valve portion, and wherein a second resilient member is configured to bias the second spool valve element in the direction of closing-off a fluid communication between the associated pump-side and cylinder-side portions by the first valve portion and is configured to provide fluid communication between the associated cylinder-side portion and the second drain passage by the second valve portion.

14. A power steering system, comprising:

means for detecting and outputting a steering torque;

first and second passages, each including a pump-side portion and a cylinder-side portion;

a hydraulic cylinder with first and second chambers, the first and second chambers being connected to the first and second passages, respectively;

a hydraulic pump which is configured to supply and discharge a hydraulic pressure to and from the first and second chambers of the hydraulic cylinder in accordance with the steering torque detected and outputted by the means for detecting and outputting steering torque;

a drain passage connected to at least one of the first and second passages;

a switching valve arranged at a connection of the drain pass passage, wherein when the hydraulic pump operates to discharge the hydraulic pressure to the at least one passage, the switching valve provides fluid communication between the pump-side and cylinder-side portions of the at least one passage and closes-off the drain passage.

wherein when the hydraulic pump stops, the switching valve provides fluid communication between the cylinder-side portion of the at least one passage and the drain passage;

wherein the switching valve comprises a valve body formed with a plurality of passage holes communicating with the pump-side and cylinder-side portions of the at least one passage and the drain passage.

wherein a spool valve element is slidably arranged in the valve body and comprises a first valve portion for opening and closing the passage holes corresponding to the pump-side and cylinder-side portions and a second valve portion for opening and closing the passage hole corresponding to the drain passage, and wherein a resilient member is configured to bias the spool valve element in the direction of closing-off a fluid communication between the pump-side and cylinder-side portions by the first valve portion and is configured to provide a fluid communication between the cylinder-side portion and the drain passage by the second valve portion.

\* \* \* \* \*